(12) United States Patent
Nishijima et al.

(10) Patent No.: US 9,331,542 B2
(45) Date of Patent: May 3, 2016

(54) ELECTRIC MOTOR

(71) Applicants: Daisuke Nishijima, Tokyo (JP); Haruyuki Hasegawa, Tokyo (JP)

(72) Inventors: Daisuke Nishijima, Tokyo (JP); Haruyuki Hasegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/434,350

(22) PCT Filed: Oct. 30, 2012

(86) PCT No.: PCT/JP2012/078070
§ 371 (c)(1),
(2) Date: Apr. 8, 2015

(87) PCT Pub. No.: WO2014/068683
PCT Pub. Date: May 8, 2014

(65) Prior Publication Data
US 2015/0270758 A1 Sep. 24, 2015

(51) Int. Cl.
*H02K 5/12* (2006.01)
*H02K 5/10* (2006.01)
*H02K 5/173* (2006.01)

(52) U.S. Cl.
CPC ............... *H02K 5/10* (2013.01); *H02K 5/1732* (2013.01)

(58) Field of Classification Search
CPC .......... H02K 5/10; H02K 5/15; H02K 5/1732
USPC ....................................................... 310/88, 89
See application file for complete search history.

(56) References Cited

U.S. PATENT DOCUMENTS

| 5,254,893 A | * | 10/1993 | Ide | F16C 17/10 310/67 R |
| 2002/0185927 A1 | * | 12/2002 | Chihara | H02K 5/1732 310/89 |
| 2005/0134130 A1 | | 6/2005 | Tsai et al. | |

FOREIGN PATENT DOCUMENTS

| JP | 50-46857 U | 5/1975 |
| JP | 50-72859 U | 6/1975 |
| JP | 3-14940 U | 2/1991 |
| JP | 8-223884 A | 8/1996 |
| JP | 2001-234958 A | 8/2001 |
| JP | 2006-33979 A | 2/2006 |
| JP | 2011-91917 A | 5/2011 |
| TW | M251388 U | 11/2004 |

OTHER PUBLICATIONS

International Search Report for PCT/JP2012/078070 dated Jan. 29, 2013 [PCT/ISA/210].
Written Opinion for PCT/JP2012/078070 dated Jan. 29, 2013 [PCT/ISA/237].

(Continued)

*Primary Examiner* — Hanh Nguyen
(74) *Attorney, Agent, or Firm* — Sughrue Mion, PLLC; Richard C. Turner

(57) ABSTRACT

The electric motor is the electric motor that includes a shaft part that rotates around a rotation shaft and a casing that accommodates at least part of the shaft part. A through hole is formed in the casing at a position that overlaps with the rotation shaft. A set screw is screwed into the through hole so as to close the through hole. An O-ring is interposed between the casing and the set screw so as to suppress intrusion of water and dust into the casing.

3 Claims, 4 Drawing Sheets

(56) References Cited

OTHER PUBLICATIONS

JPO Office Action for Application No. 2013-514440 dated May 9, 2013.

Two Office Action for Application No. 102113749 dated Oct. 21, 2014.

* cited by examiner

ELECTRIC MOTOR

CROSS REFERENCE TO RELATED APPLICATIONS

This application is a National Stage of International Application No. PCT/JP2012/078070, filed on Oct. 30, 2012, the contents of all of which are incorporated herein by reference in their entirety.

FIELD

The present invention relates to an electric motor.

BACKGROUND

Electric motors that rotate a shaft part around a rotation shaft include double shaft electric motors in which, in addition to the case of using one end side of the shaft part as an output shaft, the other end side of the shaft part can also be used as an output shaft. In the following explanations, one end side of the shaft part is also referred to as the load side of the shaft part and the other end side of the shaft part is also referred to as the counter-load side of the shaft part. In double shaft electric motors, an opening is formed in a portion of the casing that overlaps with the rotation shaft on the counter-load side so that the shaft part can be guided to the outside of the casing also from the counter-load side.

In double shaft electric motors, when only the load-side of the shaft part is used as the output shaft, the shaft part does not project from the opening of the casing on the counter-load side in some cases in view of safety. In such a case, in order to ensure the environmental resistance (waterproof property, antifouling property, and the like) and safety, it is necessary to cover the opening formed on the counter-load side with a cover or the like. For example, Patent Literature 1 and Patent Literature 2 disclose technologies for covering the opening formed on the counter-load side with a cover or a bolt.

CITATION LIST

Patent Literature

Patent Literature 1: Japanese Patent Application Laid-open No. H08-223884
Patent Literature 2: Japanese Patent Application Laid-open No. 2011-91917

SUMMARY

Technical Problem

The above conventional technologies however have a problem in that the total length of the electric motor is increased by a cover or a bolt head. Moreover, in Patent Literature 1, measures regarding the environmental resistance between the cover and the casing are not substantially taken into consideration. Moreover, in Patent Literature 2, although the environmental resistance is improved by using an O-ring, the O-ring is directly exposed to the outside. Consequently, the environmental resistance is insufficient in some cases because of the degradation of the O-ring.

The present invention has been achieved in view of the above and an object of the present invention is to obtain an electric motor capable of improving the environmental resistance while suppressing any increase in the total length.

Solution to Problem

In order to solve the above problems and achieve the object, an electric motor that includes a shaft part that rotates around a rotation shaft and a casing that accommodates at least part of the shaft part, wherein a through hole is formed in the casing at a position that overlaps with the rotation shaft, and the electric motor further includes a set screw that is screwed into the through hole, and an O-ring that is interposed between the casing and the set screw.

Advantageous Effects of Invention

The electric motor in the present invention obtains an effect where the environmental resistance can be improved while suppressing any increase in the total length.

DESCRIPTION OF EMBODIMENTS

An electric motor according to embodiments of the present invention will be explained below in detail with reference to the drawings. This invention is not limited to the embodiments.

First Embodiment

Figure 1:
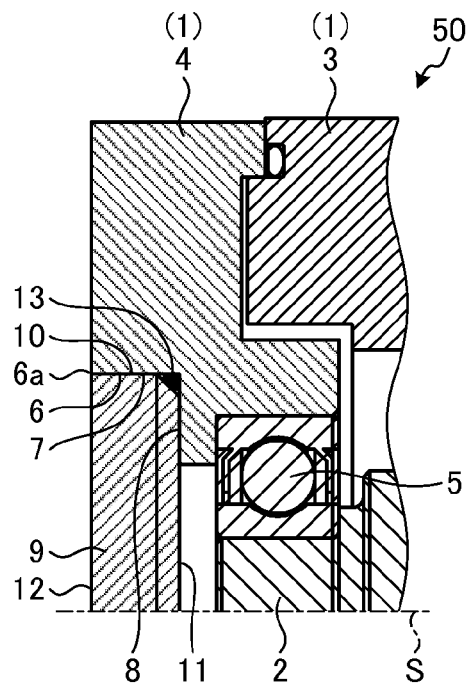
FIG. 1 is a cross-sectional view of an electric motor according to a first embodiment of the present invention cut along a surface that overlaps with a rotation shaft and is an expanded partial plan view in which the counter-load side is expanded.

FIG. 1 is a cross-sectional view of an electric motor according to a first embodiment of the present invention cut along the surface that overlaps with a rotation shaft and is an expanded partial plan view in which the counter-load side is expanded. An electric motor 50 rotates a shaft part 2, at least part of which is accommodated in a casing 1, around a rotation shaft S.

On one end side (load side) (not illustrated) of the shaft part 2, the shaft part 2 is guided to the outside of the shaft part 2. A rotation target to be rotated by the electric motor 50 is connected to the guiding portion of the shaft part 2. In other words, the load side of the shaft part 2 functions as the output shaft. For the configurations of the rotor and the stator of the electric motor 50 and the load side of the shaft part 2, configurations similar to those of general electric motors can be used; therefore, they are not illustrated and detailed explanations thereof are omitted.

The electric motor 50 is a double shaft electric motor with which a rotation target can also be connected to the counter-load side of the shaft part 2. However, FIG. 1 illustrates a case where a rotation target is not connected to the counter-load side and a rotation target is connected only to the load side, that is, FIG. 1 illustrates an example where the electric motor 50 is used as a single shaft electric motor.

The casing 1 of the electric motor 50 includes a tubular body 3 and a bracket 4. The tubular body 3 has a tubular shape in which the load side and the counter-load side (the other end side of the shaft part 2) are open. The counter-load side of the tubular body 3 is closed with the bracket 4. A bearing 5 is fixed to the bracket 4. The bearing 5 supports the shaft part 2 such that the shaft part 2 is rotatable around the rotation shaft S.

A through hole 6 is formed in a portion of the bracket 4 that overlaps with the rotation shaft S. A screw thread is formed on an inner peripheral surface 7 of the through hole 6. On the deep portion of the through hole 6, a receiving surface 8, which is perpendicular to the rotation shaft S, is formed.

FIG. 1 illustrates a case where the electric motor 50 is used as a single shaft electric motor and thus the counter-load side of the shaft part 2 is not guided to the outside of the casing 1. Therefore, the shaft part 2 does not penetrate through the through hole 6. The through hole 6 is closed with a set screw 9.

On an outer peripheral surface 10 of the set screw 9, a screw thread engaging the screw thread formed on the through hole 6 is formed. The set screw 9 does not have a portion that has an outer diameter larger than that of the outer peripheral surface 10 portion on which a screw thread is formed; therefore, the set screw 9 can be screwed into the through hole 6 up to the position at which a rear end surface 12 of the set screw 9 does not project from an opening 6a of the through hole 6. Accordingly, any increase in the total length of the electric motor 50 due to the set screw that closes the through hole 6 can be suppressed.

A tip surface 11 of the set screw 9 and the receiving surface 8 of the through hole 6 face each other by screwing the set screw 9 into the through hole 6. An O-ring 13 is interposed between the tip surface 11 of the set screw 9 and the receiving surface 8 of the through hole 6. In the present embodiment, the O-ring 13 is interposed between the outer peripheral portion of the tip surface 11 and the receiving surface 8. Accordingly, intrusion of water and dust into the casing 1 can be suppressed; therefore, the environmental resistance of the electric motor 50 can be improved. Moreover, because the O-ring 13 is provided in the through hole 6, degradation of the O-ring 13 can be suppressed compared with the case where the O-ring 13 is exposed to the outside. Thus, the environmental resistance of the electric motor 50 can be further improved.

Figure 2:
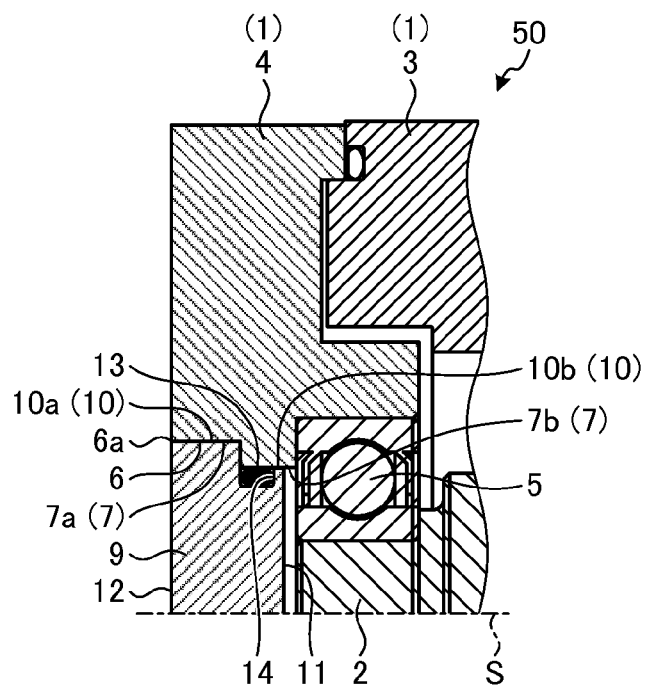
FIG. 2 is a cross-sectional view of an electric motor according to a first modified example cut along a surface that overlaps with a rotation shaft and is an expanded partial plan view in which the counter-load side is expanded.

FIG. 2 is a cross-sectional view of the electric motor 50 according to a first modified example cut along the surface that overlaps with the rotation shaft S and is an expanded partial plan view in which the counter-load side is expanded. In the first modified example, the inner peripheral surface 7 of the through hole 6 includes a first inner peripheral surface 7a, on which a screw thread is formed, and a second inner peripheral surface 7b, which is provided on the deep side of the first inner peripheral surface and on which a screw thread is not formed. The inner diameter of the second inner peripheral surface 7b portion is smaller than the inner diameter of the first inner peripheral surface 7a portion.

The outer peripheral surface 10 of the set screw 9 includes a first outer peripheral surface 10a, on which a screw thread engaging the first inner peripheral surface 7a is formed, and a second outer peripheral surface 10b, which is provided on the tip side of the first outer peripheral surface 10a and is accommodated on the inner side of the second inner peripheral surface 7b and on which a screw thread is not formed. The O-ring 13 is interposed between the second inner peripheral surface 7b and the second outer peripheral surface 10b. A groove 14, into which the O-ring 13 is fitted, is formed on the second outer peripheral surface 10b of the set screw 9.

In the electric motor 50 according to the first modified example, in a similar manner to the case illustrated in FIG. 1, the environmental resistance of the electric motor 50 can be further improved while suppressing any increase in the total length of the electric motor 50.

Figure 3:
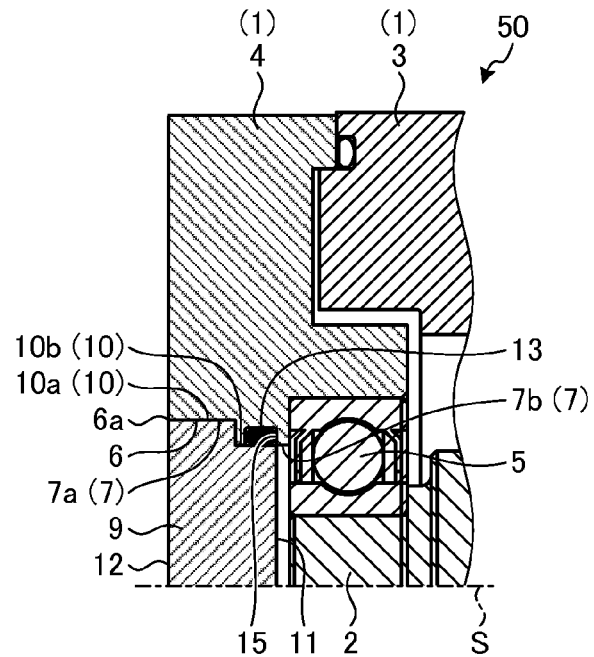
FIG. 3 is a cross-sectional view of an electric motor according to a second modified example cut along a surface that overlaps with a rotation shaft and is an expanded partial plan view in which the counter-load side is expanded.

FIG. 3 is a cross-sectional view of the electric motor 50 according to a second modified example cut along the surface that overlaps with the rotation shaft S and is an expanded partial plan view in which the counter-load side is expanded. The electric motor 50 according to the second modified example has substantially the same configuration as that explained in the first modified example. However, a groove 15, into which the O-ring 13 is fitted, is formed on the second inner peripheral surface 7b side of the through hole 6. In the electric motor 50 according to the second modified example, in a similar manner to the above cases, the environmental resistance of the electric motor 50 can be further improved while suppressing any increase in the total length of the electric motor 50.

Figure 4:
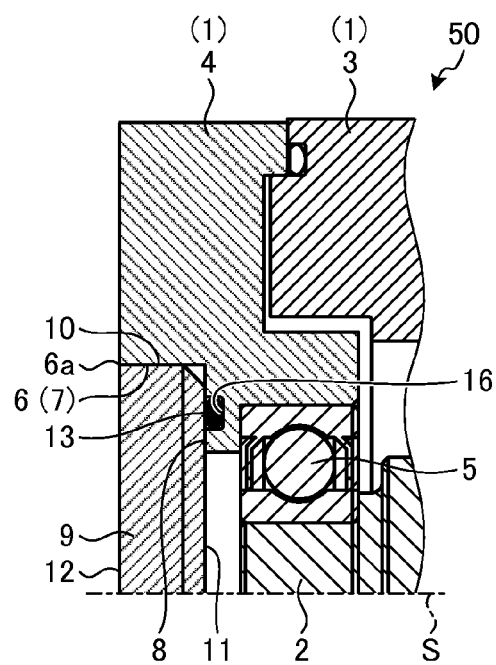
FIG. 4 is a cross-sectional view of an electric motor according to a third modified example cut along a surface that overlaps with a rotation shaft and is an expanded partial plan view in which the counter-load side is expanded.

FIG. 4 is a cross-sectional view of the electric motor 50 according to a third modified example cut along the surface that overlaps with the rotation shaft S and is an expanded partial plan view in which the counter-load side is expanded. In the present modified example, in a similar manner to the case illustrated in FIG. 1, the O-ring 13 is interposed between the tip surface 11 of the set screw 9 and the receiving surface of the through hole 6. However, a groove 16 is formed on the receiving surface 8 of the through hole 6 and the O-ring 13 is fitted into the groove 16.

In the electric motor 50 according to the third modified example, in a similar manner to the above cases, the environmental resistance of the electric motor 50 can be further improved while suppressing any increase in the total length of the electric motor 50.

Figure 5:
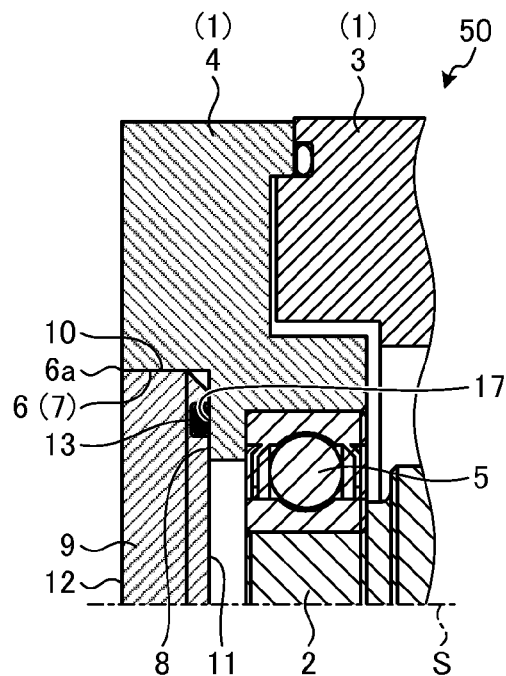
FIG. 5 is a cross-sectional view of an electric motor according to a fourth modified example cut along a surface that overlaps with a rotation shaft and is an expanded partial plan view in which the counter-load side is expanded.

FIG. 5 is a cross-sectional view of the electric motor 50 according to a fourth modified example cut along the surface that overlaps with the rotation shaft S and is an expanded partial plan view in which the counter-load side is expanded. The electric motor 50 according to the fourth modified example has substantially the same configuration as that explained in the third modified example. However, a groove 17, into which the O-ring 13 is fitted, is formed on the tip surface of the set screw 9. In the electric motor 50 according to the fourth modified example, in a similar manner to the above cases, the environmental resistance of the electric motor 50 can be further improved while suppressing any increase in the total length of the electric motor 50.

Figure 6:
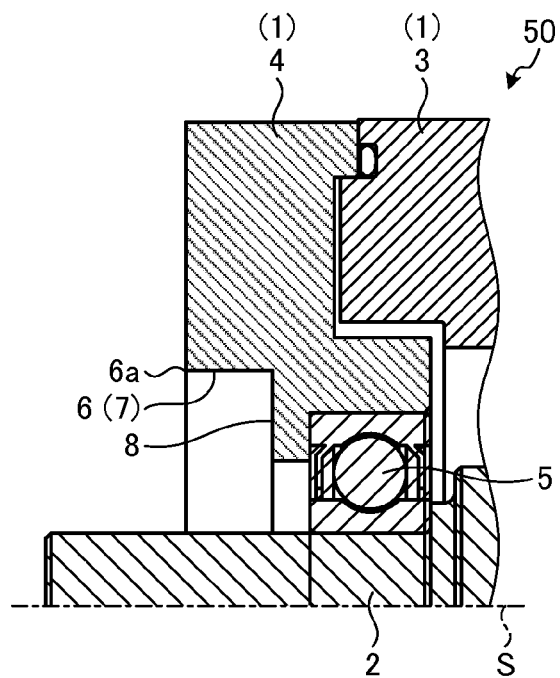
FIG. 6 is a cross-sectional view of an electric motor according to a fifth modified example cut along a surface that overlaps with a rotation shaft and is an expanded partial plan view in which the counter-load side is expanded.

FIG. 6 is a cross-sectional view of the electric motor 50 according to a fifth modified example cut along the surface that overlaps with the rotation shaft S and is an expanded partial plan view in which the counter-load side is expanded. The fifth modified example illustrates a case where the electric motor 50 is used as a double shaft electric motor with which the counter-load side of the shaft part 2 is also guided to the outside of the casing 1 and a rotation target can also be connected to the counter-load side.

Because the shaft part 2 is guided to the outside of the casing 1 through the through hole 6, the set screw is not screwed into the through hole 6. Therefore, it is not necessary to form a screw thread on the inner peripheral surface 7 of the through hole 6. Accordingly, if the brackets 4 in which a screw thread is not formed on the inner peripheral surface 7 of the through hole 6 are held in stock, it is possible to use the brackets 4 both for the double shaft electric motor 50 and the single shaft electric motor 50. In other words, when the bracket 4 is used for the double shaft electric motor 50, the bracket 4 is used as it is, and when the bracket 4 is used for the single shaft electric motor 50, it is satisfactory to perform a process of forming a screw thread on the inner peripheral surface of the through hole 6.

Accordingly, it is possible to manufacture the bracket 4 used for the double shaft electric motor 50 and the bracket 4 used for the single shaft electric motor 50 by using the same die, enabling a reduction in manufacturing cost. Moreover, it is not necessary to perform a process of forming a screw thread when the bracket 4 is used for the double shaft electric motor 50, enabling a further reduction in manufacturing cost.

Figure 7:
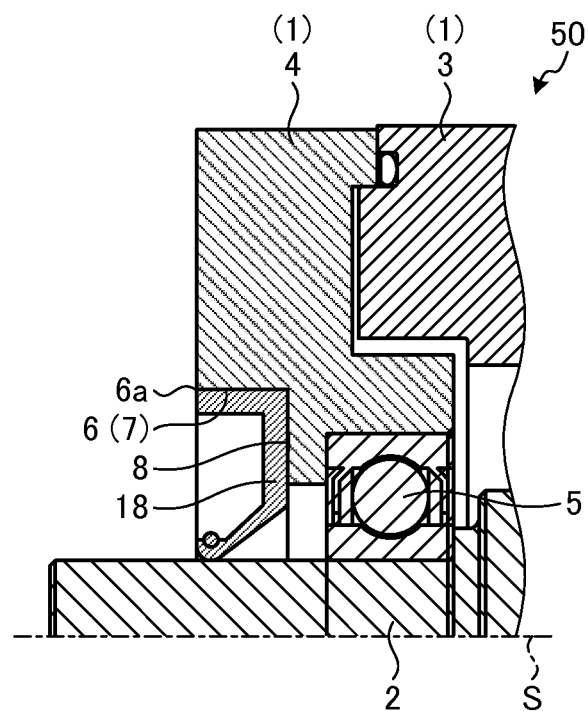
FIG. 7 is a cross-sectional view of an electric motor according to a sixth modified example cut along a surface that overlaps with a rotation shaft and is an expanded partial plan view in which the counter-load side is expanded.

FIG. 7 is a cross-sectional view of the electric motor 50 according to a sixth modified example cut along the surface that overlaps with the rotation shaft S and is an expanded partial plan view in which the counter-load side is expanded. The sixth modified example illustrates the double shaft electric motor 50 in a similar manner to FIG. 6.

In the sixth modified example, the space between the inner peripheral surface 7 of the through hole 6 and the shaft part 2 is covered with an oil seal 18. Accordingly, intrusion of water and dust into the casing 1 can be suppressed; therefore, the environmental resistance of the electric motor 50 can be improved.

The sealability between the inner peripheral surface 7 and the oil seal 18 can be improved by not forming a screw thread on the inner peripheral surface 7 of the through hole 6 and thus the environmental resistance of the electric motor 50 can be further improved.

In a similar manner to the fifth modified example described above, the manufacturing cost can be reduced by standardizing the brackets 4 to be held in stock and omitting the process of forming a screw thread.

INDUSTRIAL APPLICABILITY

As described above, the electric motor according to the present invention is useful for an electric motor that can be used also as a double shaft electric motor.

REFERENCE SIGNS LIST 1 casing, 2 shaft part, 3 tubular body, 4 bracket, 5 bearing, 6 through hole, 6a opening, 7 inner peripheral surface, 7a first inner peripheral surface, 7b second inner peripheral surface, 8 receiving surface, 10 outer peripheral surface, 10a first outer peripheral surface, 10b second outer peripheral surface, 11 tip surface, 12 rear end surface, 13 O-ring, 14, 15, 16, 17 groove, 18 oil seal, 50 electric motor, S rotation shaft.

The invention claimed is:

1. An electric motor that includes a shaft part that rotates around a rotation shaft and a casing that accommodates at least part of the shaft part, wherein
   a through hole is formed in the casing at a position that overlaps with the rotation shaft,
   the electric motor further includes
      a set screw that is screwed into the through hole from an outside of the casing, and
      an O-ring that is interposed between the casing and the set screw,
   the set screw does not have a portion that has an outer diameter larger than an outer diameter of an outer peripheral surface portion on which a screw thread is formed and is capable of being screwed into the through hole up to a position at which a rear end surface of the set screw does not project from an opening of the through hole,
   the through hole includes
      a first inner peripheral surface on which a screw thread is formed, and
      a second inner peripheral surface that is provided on a deep side of the first inner peripheral surface and on which a screw thread is not formed,
   an inner diameter of the second inner peripheral surface portion is smaller than an inner diameter of the first inner peripheral surface portion,
   the set screw includes
      a first outer peripheral surface on which a screw thread engaging the first inner peripheral surface is formed, and
      a second outer peripheral surface that is provided on a tip side of the first outer peripheral surface and is accommodated on an inner side of the second inner peripheral surface and on which a screw thread is not formed, and
   the O-ring is interposed between the second inner peripheral surface and the second outer peripheral surface.

2. The electric motor according to claim 1, wherein a groove into which the O-ring is fitted is formed on the second outer peripheral surface.

3. The electric motor according to claim 1, wherein a groove into which the O-ring is fitted is formed on the second inner peripheral surface.

* * * * *